(12) United States Patent
Wang (10) Patent No.: US 10,501,103 B1
(45) Date of Patent: Dec. 10, 2019

(54) ARTICULATING WAGON FRAME

(71) Applicant: Weigang Wang, El Monte, CA (US)

(72) Inventor: Weigang Wang, El Monte, CA (US)

( * ) Notice: Subject to any disclaimer, the term of this patent is extended or adjusted under 35 U.S.C. 154(b) by 0 days.

(21) Appl. No.: 16/541,427

(22) Filed: Aug. 15, 2019

(51) Int. Cl.
*B62B 3/02* (2006.01)
*B62B 3/00* (2006.01)

(52) U.S. Cl.
CPC ............ *B62B 3/02* (2013.01); *B62B 3/007* (2013.01); *B62B 2205/04* (2013.01)

(58) Field of Classification Search
CPC ........ B62B 3/02; B62B 3/007; B62B 2205/04
See application file for complete search history.

(56) References Cited

U.S. PATENT DOCUMENTS

| 9,327,749 | B2 | 5/2016 | Young | |
|---|---|---|---|---|
| 9,738,298 | B1 | 8/2017 | Yang | |
| 9,855,962 | B1* | 1/2018 | Chen | B62B 5/067 |
| 2010/0090444 | A1* | 4/2010 | Chen | B62B 3/007 |
| | | | | 280/651 |
| 2010/0156069 | A1* | 6/2010 | Chen | B62B 3/007 |
| | | | | 280/639 |
| 2011/0204598 | A1 | 8/2011 | Stevenson | |
| 2014/0353945 | A1* | 12/2014 | Young | B62B 3/02 |
| | | | | 280/650 |
| 2015/0035258 | A1* | 2/2015 | Chen | B62B 3/02 |
| | | | | 280/651 |
| 2015/0151771 | A1* | 6/2015 | Jin | B62B 3/027 |
| | | | | 280/651 |
| 2017/0259838 | A1* | 9/2017 | Choi | B62B 3/007 |

* cited by examiner

*Primary Examiner* — Brian L Swenson
(74) *Attorney, Agent, or Firm* — Clement Cheng (57) ABSTRACT

An articulating wagon frame has an open position and a closed position. The frame has eight corner joints, namely four upper corner joints and four lower corner joints. The four upper corner joints include a right front upper joint, a left front upper joint, a right rear upper joint, and a left rear upper joint. The four lower corner joints include a right front lower joint, a left front lower joint, the right rear lower joint, and a left rear lower joint. Four linear joints include a right middle upper joint, a left middle upper joint, a left middle lower joint, and a right middle lower joint. Six vertical supports include a right front vertical support, a left front vertical support, a right middle vertical support, a left middle vertical support, a right rear vertical support, and a left rear vertical support.

16 Claims, 5 Drawing Sheets

ARTICULATING WAGON FRAME

FIELD OF THE INVENTION

The present invention is in the field of a foldable wagon frame.

DISCUSSION OF RELATED ART

A variety of prior art references describe various structures for folding wagons. For example, in the U.S. Pat. No. 9,738,298 Collapsible Wagon Comprising a Tailgate by Baoqing Yang, published Aug. 22, 2017 the abstract discloses, "A collapsible wagon is adjustable between an expanded configuration and a collapsed configuration. The wagon comprises a frame, four wheels, and a pliable liner. The frame has a front wall, two side walls, and a rear tailgate. The walls and tailgate of the wagon are collapsible for storing the wagon."

For example, in the U.S. Pat. No. 9,738,298 Collapsible Wagon Comprising a Tailgate by Baoqing Yang, published May 3, 2016 the abstract discloses, "A foldable wagon is provided having a collapsible frame that converts the wagon from a use configuration to a folded configuration for storage and transportation. The foldable wagon has a collapsible frame positonable in an open position and a collapsed position, a plurality of wheels coupled to the collapsible frame, a plurality of substantially rigid seats pivotally coupled to the collapsible frame, and a flexible housing about the collapsible frame to form a sidewall for the wagon. The substantially rigid seats each having a substantially rigid seat back and a substantially rigid seat bottom hingedly coupled to the seat back."

For example, in the United States publication number 20110204598 Folding Wagon by Mark Stevenson, published Aug. 25, 2011 the abstract discloses, "A folding wagon is provided having a frame with cross-member pairs that open and close in a scissor-like motion. The cross-members are connected to tower members at the corners by joints. Upper ends of the cross-members connect to slider joints that are movable along the length of the tower members. A cargo area is attached to the frame. The wagon is configurable between a collapsed position and a deployed or expanded position." The above prior art references are incorporated herein by reference.

SUMMARY OF THE INVENTION

An articulating wagon frame has an open position and a closed position. The frame has eight corner joints, namely four upper corner joints and four lower corner joints. The four upper corner joints include a right front upper joint, a left front upper joint, a right rear upper joint, and a left rear upper joint. The four lower corner joints include a right front lower joint, a left front lower joint, the right rear lower joint, and a left rear lower joint. Four linear joints include a right middle upper joint, a left middle upper joint, a left middle lower joint, and a right middle lower joint. Six vertical supports include a right front vertical support, a left front vertical support, a right middle vertical support, a left middle vertical support, a right rear vertical support, and a left rear vertical support. The right front vertical support connects the right front upper joint to the right front lower joint.

The left front vertical support connects the left front upper joint to the left front lower joint. The right middle vertical support connects the right middle upper joint to the right middle lower joint. The left middle vertical support connects the left middle upper joint to the left middle lower joint. The right rear vertical support connects the right rear upper joint to the right rear lower joint. The left rear vertical support connects the left rear upper joint to the left rear lower joint. The six vertical supports make a rigid connection. The frame has twelve hinge members including six upper hinge members and six lower hinge members. The six upper hinge members include a front upper hinge member, a front right upper hinge member, a front left upper hinge member, a rear left upper hinge member, a rear right upper hinge member, and a rear upper hinge member.

The six lower hinge members include a front lower hinge member, a front right lower hinge member, a front left lower hinge member, a rear right lower hinge member, a rear left lower hinge member, and a rear lower hinge member. The twelve hinge members each have a hinge portion and a pair of extensions extending from the hinge portion. The twelve hinge members are configured to fold between a hinge open position and a hinge closed position. The front upper hinge member is pivotally connected between the right front upper joint and the left front upper joint. The front upper hinge member is pivotally connected between the right front upper joint and the right middle upper joint. The rear right upper hinge member is pivotally connected between the right middle upper joint and the right rear upper joint. The rear upper hinge member is connected between the right rear upper joint and the left rear upper joint. The rear left upper hinge member is connected between the left rear upper joint and the left middle upper joint. The front left upper hinge member is connected between the left middle upper joint and the left front upper joint. The front lower hinge member is connected between the left front lower joint and the right front door joint. The front left lower hinge member connects the left front lower joint to the left middle lower joint. The rear left lower hinge member connects the left rear lower joint to the left middle lower joint. The rear lower hinge member connects the left rear lower joint to the right rear lower joint. The rear right lower hinge member connects the right rear lower joint to the right middle lower joint. The front right lower hinge member connects the right middle lower joint to the right front lower joint.

The frame has one middle joint that includes a first middle joint pivot, a second middle joint pivot, a third middle joint pivot, and a fourth middle joint pivot. The first middle joint pivot is pivotally connected to a first middle member. The second middle joint pivot is pivotally connected to a second middle member. The third middle joint pivot is pivotally connected to a third middle member. The fourth middle joint pivot is pivotally connected to a fourth middle joint member. The first middle member is pivotally connected to the right front lower joint. The second middle member is pivotally connected to the left front lower joint. The third middle member is pivotally connected to the right rear lower joint. The fourth middle member is pivotally connected to the left rear lower joint.

The twelve hinge members each have a first hinge socket and a second hinge socket. The first hinge socket connects to a first extension, and the second hinge socket connects to a second extension. The right front upper joint abuts the left front upper joint at a front upper joint abutment when the wagon is in the closed position. The right rear upper joint abuts the left rear upper joint at a rear upper joint abutment when the wagon is in the closed position. The left middle upper hinge abuts the left front upper joint and the left rear upper joint at a pair of middle upper joint abutments when the wagon is in the closed position. The right middle upper hinge abuts the right front upper joint and the right rear upper joint at a pair of middle upper joint abutments when the wagon is in the closed position.

The middle joint rises to fit between the right middle upper joint and the left middle upper joint when the wagon is in the closed position. The twelve hinge members each have a first hinge portion having a first hinge socket and a second hinge portion having a second hinge socket. The first hinge socket connects to a first extension, and the second hinge socket connects to a second extension, so that each of the twelve hinge members fold between a generally horizontal parallel orientation to a folded orientation.

The first hinge portion has a first hinge stop, and the second hinge portion has a second hinge stop. The first hinge stop abuts the second hinge stop when the articulating wagon frame is in open position. The six upper hinge members are configured to abut the six lower hinge members when the articulating wagon frame is in closed position.

The following call out list of elements can be a useful guide in referencing the elements of the drawings.
21 Right Front Vertical Support
22 Left Front Vertical Support
23 Right Rear Vertical Support
24 Left Rear Vertical Support
25 Right Middle Vertical Support
26 Left Middle Vertical Support
31 Right Front Lower Joint
32 Left Front Lower Joint
33 Right Rear Lower Joint
34 Left Rear Lower Joint
35 Right Middle Lower Joint
36 Left Middle Lower Joint
37 Middle Joint
38 Flat Hinge Bottom
41 Right Front Upper Joint
42 Left Front Upper Joint
43 Right Rear Upper Joint
44 Left Rear Upper Joint
45 Right Middle Upper Joint
46 Left Middle Upper Joint
47 Middle Upper Joint Abutment
49 Rear Upper Joint Abutment
51 Front Lower Hinge Member
52 Front Right Lower Hinge Member
53 Front Left Lower Hinge Member
54 Rear Right Lower Hinge Member
55 Rear Left Lower Hinge Member
56 Rear Lower Hinge Member
57 First Hinge Socket
58 Second Hinge Socket
59 First Hinge Stop
61 Front Upper Hinge Member
62 Front Right Upper Hinge Member
63 Front Left Upper Hinge Member
64 Rear Left Upper Hinge Member
65 Rear Right Upper Hinge Member
66 Rear Upper Hinge Member
67 Second Hinge Stop
68 Hinge Pin
69 Flat Hinge Top
71 First Middle Joint Pivot
72 Second Middle Joint Pivot
73 Third Middle Joint Pivot
74 Fourth Middle Joint Pivot
75 First Middle Member
76 Second Middle Member
77 Third Middle Member
78 Fourth Middle Member
81 First Extension
82 Second Extension
83 First Hinge Portion
84 Second Hinge Portion
85 Hinge
87 Front Wheels
88 Pivot Pin
89 Back Wheels

DETAILED DESCRIPTION OF THE PREFERRED EMBODIMENT

Figure 1:
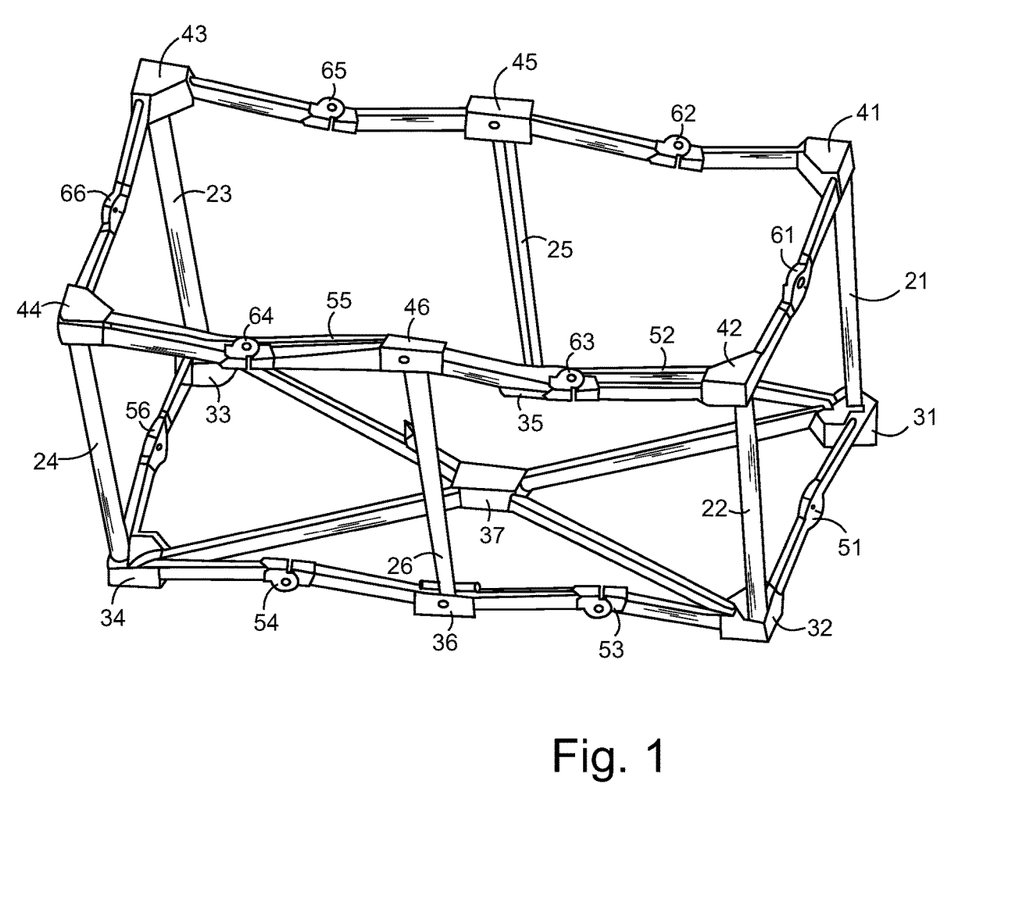
FIG. 1 is a side perspective view.

As seen in FIG. 1, the articulating wagon frame has six upper joint members and six lower joint members. The upper joint members include a right front upper joint 41, a left front upper joint 42, a right rear upper joint 43, a left rear upper joint 44, a right middle upper joint 45, and a left middle upper joint 46. The right front upper joint 41, the right middle upper joint 45, and the right rear upper joint 43 are linearly aligned. Similarly, the left front upper joint 42, the left middle upper joint 46, and the left rear upper joint 44 are linearly aligned. The right front upper joint 41 and the left front upper joint 42 are formed as corners for receiving members pivotally connected to it at a 90° angle. Similarly, the right rear upper joint 43 and the left rear upper joint 44 also pivotally connect to members at a 90° angle.

The right middle upper joint 45 and the left middle upper joint 46 also respectively connect to a pair of folding members. The right front upper joint 41 and the right middle upper joint 45 pivotally connected to a front right upper hinge member 62. The front right upper hinge member 62 has a pair of extensions that extend from a hinge. The extensions are pivotally jointed to the right front upper joint 41 and the right middle upper joint 45. The front right upper hinge member 62 folds downward and has a stop for limiting the angle of the front right upper hinge member 62 to a horizontal position that is approximately 180° in an open position. The front right upper hinge member 62 has an open position where the extensions are approximately 180° from each other and a closed position where the extensions have an acute angle that is closer to being parallel with each other.

Similarly, the right rear upper joint 43 and the right middle upper joint 45 is connected at the rear right upper hinge member 65. The rear right upper hinge member 65 has a similar structure to the front right upper hinge member 62. The rear right upper hinge member 65 also preferably has a stop for limiting the angle between an open position and a closed position. The open position of the rear right upper hinge member 65 is generally horizontal and the closed position of the rear right upper hinge member 65 is generally where the extensions have a folded acute angle.

Analogously, the front left upper hinge member 63 connects between the left middle upper joint 46 and the left front upper joint 42. Also, the rear left upper hinge member 64 next between the left rear upper joint 44 and the left middle upper joint 46. The rear left upper hinge member 64 and the front left upper hinge member 63 have an open position and a closed position and are parallel to, move with and are preferably mechanically similar to the rear right upper hinge member 65 and the front right upper hinge member 62.

In the right front upper joint 41 and the left front upper joint 42 are connected by a front upper hinge member 61. The right rear upper joint 43 and the left rear upper joint 44 are also connected at a rear upper hinge member 66. The collection of the upper hinge members, namely the front upper hinge member 61, the front right upper hinge member 62, the front left upper hinge member 63, the rear left upper hinge member 64, the rear right upper hinge member 65, and the rear upper hinge member 66 all have the same hinge orientation where the extensions formed as rods have an open position approximately horizontal to each other where the extensions are horizontal and parallel to each other. The upper hinge members also have the same closed position where the extensions fold towards each other so that the hinge portions travel downwardly until the extensions have a small acute angle to each other.

The lower portion of the articulating wagon frame similarly includes an analogous structure to the upper portion of the articulating wagon frame. The right front lower joint 31 is connected to the left front lower joint 32 at a front lower hinge member 51. The front lower hinge member 51 has an open position and a closed position. An open position, the front lower hinge member 51 has a horizontal orientation where the extensions of the front lower hinge member 51 are generally parallel to each other and stopped in a horizontal orientation at approximately 180° from each other. The closed position of the front lower hinge member 51 is a folded position where the extensions of the front lower hinge member 51 rotate to an acute angle relative to each other. Preferably, an upper portion of the front lower hinge member 51 has a flat portion that abuts a lower portion of the front upper hinge member 61 so that the pair of hinges in closed position support each other and limit further motion.

Similarly, the rear upper hinge member 66 preferably abuts the rear lower hinge member 56. The rear lower hinge member 56 connects between the left rear lower joint 34 and the right rear lower joint 33. The extensions of the rear lower hinge member 56 have an open position in a generally parallel horizontal configuration at approximately 180° from each other and stopped so that further rotation is limited. The rear lower hinge member 56 also has a closed position where the extensions form an acute angle with each other. The hinge portion of the rear lower hinge member 56 can be formed of a plastic injection molded member having sockets to receive a pair of rod shaped extensions so that the rod shaped extensions are pivotally mounted to each other. Analogously, the left front lower joint 32 and the left middle lower joint 36 are connected together by the front left lower hinge member 53. The left middle lower joint 36 connects to the left rear lower joint 34 at the left rear lower hinge member 54. In the same way, the right front lower joint 31 connects to the right middle lower joint 35 by the front right lower hinge member 52. Also, the right middle lower joint 35 connects to the right rear lower joint 33 at the right rear lower hinge member 55.

The group of lower hinge members include the front lower hinge member 51, the front right lower hinge member 52, the front left lower hinge member 53, the left right lower hinge member 54, the rear right lower hinge member 55, and the rear lower hinge member 56. The lower hinge members have an open position where the extensions are generally parallel in a horizontal position and a folded position or a closed position where the extensions are folded together at an acute or parallel angle. Preferably, the folded position has a small acute angle.

The group of lower hinge members each have a matching upper hinge member. Each lower hinge member is aligned to an upper hinge member so that the lower hinge member abuts the upper hinge member to limit further motion when a user folds the articulating frame to the folded position. The limit of further motion defines the closed position, also called the folded position. Accordingly, a total of thirteen joints are used for this device. The joints include eight corner joints. The eight corner joints are the right front upper joint 41, the left front upper joint 42, the right rear upper joint 43, the left rear upper joint 44, the right front lower joint 31, the left front lower joint 32, the right rear lower joint 33, and the left rear lower joint 34. Each of the corner joints connect to a pair of hinge members, so that the hinge members are position at a 90° angle from each other. There are also four joints that are linear joints that connect to a pair of hinge members, so that the hinge members are aligned linearly to each other. The linear joints include the right middle upper joint 45, the left middle upper joint 46, the left middle lower joint 36, and the right middle lower joint 35. Each of the linear joints connects only to corner joints and does not connect to any other linear joint, while each of the corner joints connects to one linear joint and one other corner joint.

The middle joint 37 is a unique joint in this articulating wagon frame because it connects to the right front lower joint 31, the left front lower joint 32, the right rear lower joint 33, and the left rear lower joint 34. Thus, the lower corner joints differ from the upper corner joints because the lower corner joints have three pivot connections while the upper corner joints have only a pair of connections.

The upper joints are rigidly connected to the lower joints by vertical supports that can be formed as aluminum tubular sections. The right front upper joint 41 is connected to the right front lower joint 31 by a right front vertical support 21. The left front upper joint 42 is connected to the left front lower joint 32 by a left front vertical support 22. The right middle upper joint 45 is connected to the right middle vertical support 25 which is then connected to the right middle lower joint 35. The left middle upper joint 46 is connected to the left middle vertical support 26 which is in turn connected to the left middle lower joint 36. The right rear upper joint 43 is connected to the right rear lower joint 33 by a right rear vertical support 23. The left rear lower joint 34 is connected to the left rear upper joint 44 by a left rear vertical support 24. Because the vertical supports do not telescope or fold, the vertical supports and the upper and lower joints that they are connected to define the height of the articulating wagon frame. The height of the articulating wagon friend does not change during folding and unfolding.

Figure 2:
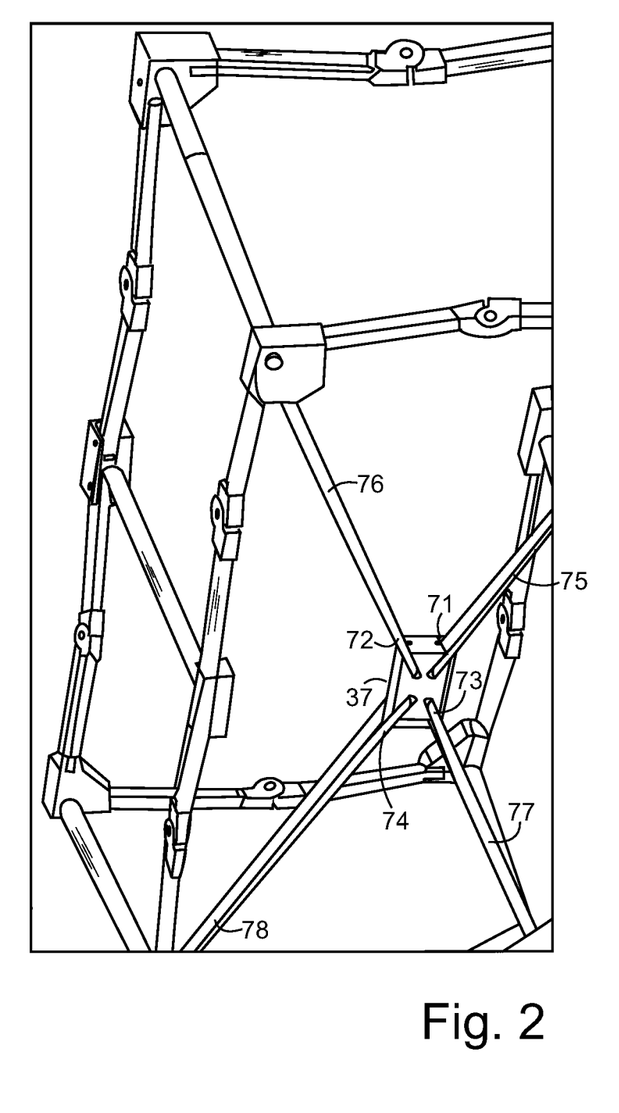
FIG. 2 is a bottom perspective view.

As seen in FIG. 2, the middle joint 37 has a first middle joint pivot 71, a second middle joint pivot 72, a third middle joint pivot 73, and a fourth middle joint pivot 74 preferably configured in a regular pattern. The first middle joint pivot 71 is connected to the first middle member 75, the second middle joint pivot 72 is connected to the second middle member 76, the third middle member 77 is pivotally mounted at the third middle joint pivot 73, and the fourth middle joint pivot 74 receives the fourth middle member 78 and a pivotal connection to the middle joint 37. Preferably, the second middle member 76 is parallel to the third middle member 77, and the fourth middle member 78 is parallel to the first middle member 75, when the middle members are in open position. When the middle joint 37 folds to a closed position, the middle members fold toward each other and rotate to a small acute angle that is close to being parallel to each other as seen in the drawings.

Figure 3:
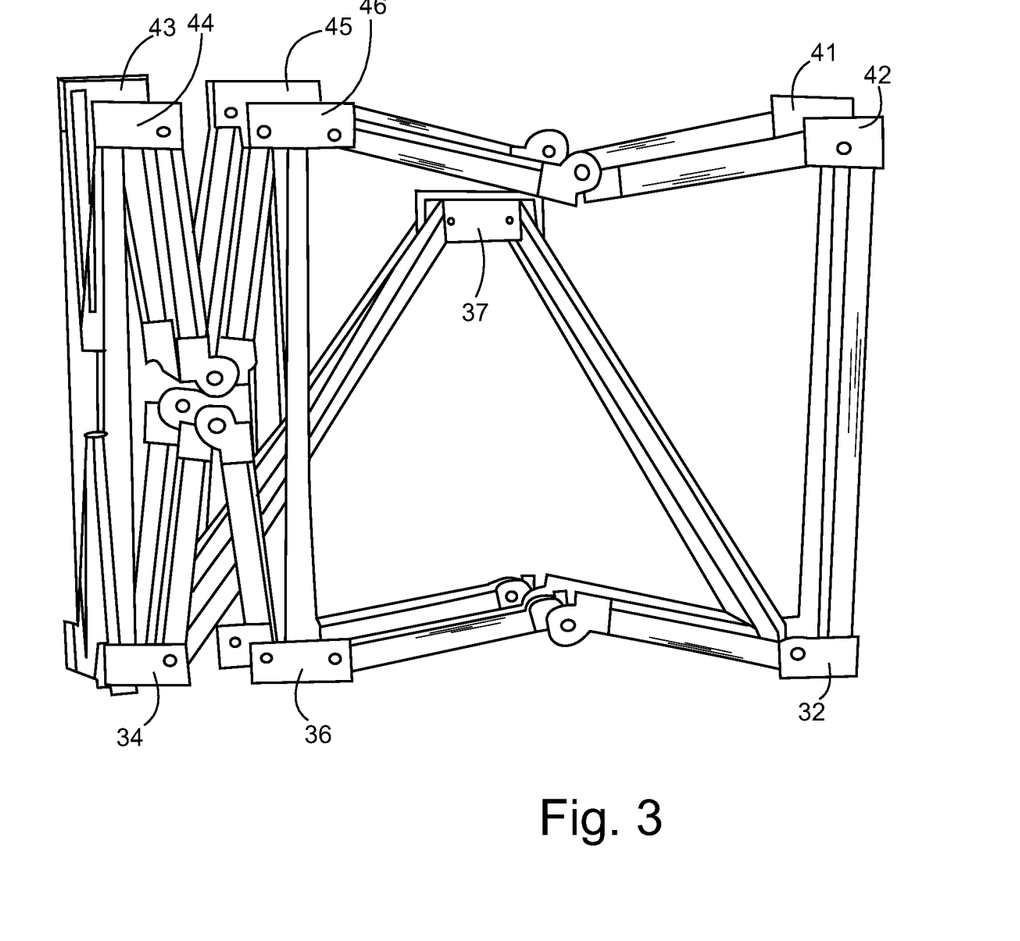
FIG. 3 is a side perspective view.

As seen in FIG. 3, the front portion of the wagon frame can be deployed separately from the rear portion of the wagon frame. While the front portion is nearly deployed, the rear portion can be nearly folded. This allows the user to deploy half of the wagon at a time thereby decreasing total required body strength.

Figure 4:
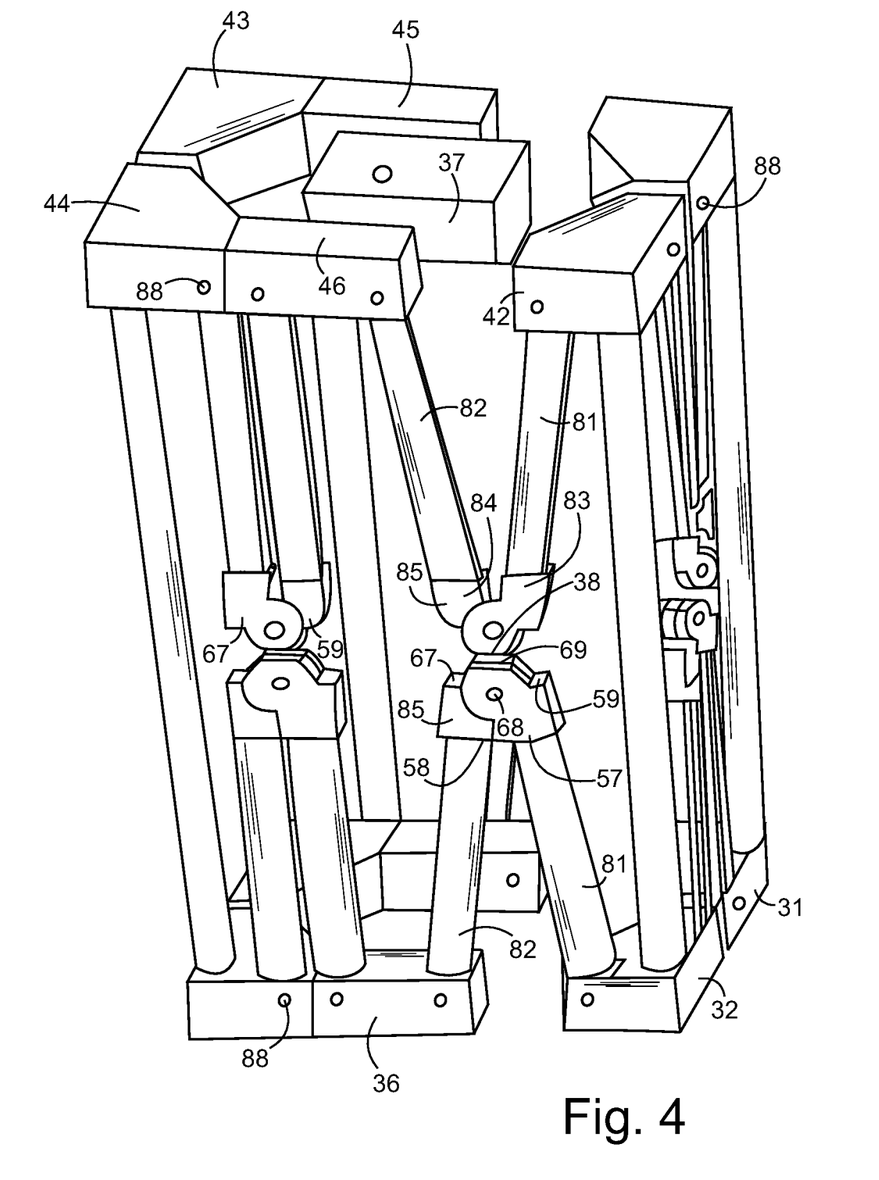
FIG. 4 is a partial exploded view.

As seen in FIG. 4, each of the hinges 85 preferably has a first hinge part 83 having a first hinge socket 57 and a second hinge part 84 having a second hinge socket 58. The hinges have a hinge pin 68 that can be formed of a short metal pin of a cylindrical shape that fits into the injection molded hinges. Preferably, the hinges have a first hinge socket 57 and a second hinge socket 58. The first hinge socket preferably receives a first extension 81, and the second hinge socket 58 preferably receives a second extension 82. The extensions are preferably formed as hollow aluminum tubular extrusions. The ends of the hollow aluminum tubular extrusions can be interference fit, or riveted to the plastic injection molded hinges. Pivot pins 88 can pivotally connect the extension members to the upper and lower joints.

The first hinge stop 59 is formed on each of the hinges and can be plastic injection molded. The first hinge stop 59 abuts the second hinge stop 67. The second hinge stop 67 is formed on an opposite portion of the hinge than the first hinge stop 59. In an open position, the first hinge stop 59 is rotated away from the second hinge stop 67. As each hinge rotates from an open position to a closed position, the respective first hinge stops 59 rotate toward the second hinge stops 67. The flat hinge bottoms 38 formed on the upper hinges are configured to abut the flat hinge tops 69 of the lower hinges.

Figure 5:
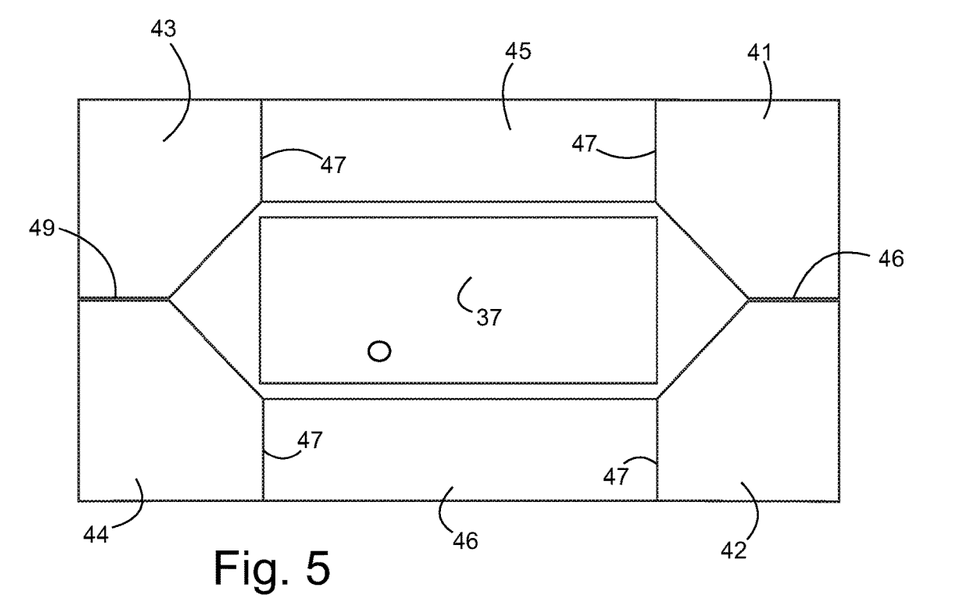
FIG. 5 is a top view of the articulating wagon frame in closed position.

As seen in FIG. 5, the top view of the articulating wagon frame enclosed position shows that the upper joints abut each other. In a similar way, the lower joints abut each other as well. The right front upper joint 41 abuts the left front upper joint 42 at a front upper joint abutment 46. The right front upper joint 41 abuts the right middle upper joint 45 at a middle upper joint abutment 47. The right rear upper joint 43 and the right middle upper joint 45 abut each other at a middle upper joint abutment 47. In the same way, the left middle upper hinge 46 abuts the left front upper joint 42 and the left rear upper joint 44 at a middle joint upper abutment 47, for a total of four middle upper joint abutments. The middle joint upper abutments 47 are parallel to each other and perpendicular to a lengthwise direction of the wagon. The right rear upper joint 43 abuts the left rear upper joint 44 at a rear upper joint abutment 49. The variety of different abutments are designed to prevent crushing or bending of the extension members.

Figure 6:
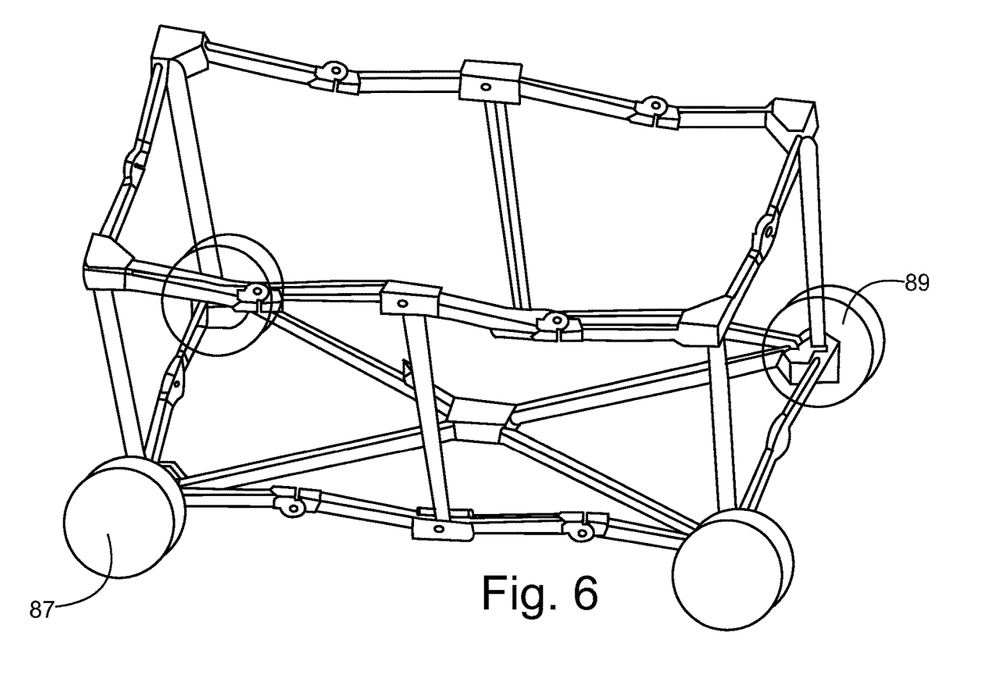
FIG. 6 is diagram showing wheels.

As seen in FIG. 6, the wagon preferably has a pair of back wheels 89 and a pair of front wheels 87. The front or rear wheels can be made to pivot according to available prior art mechanisms. The back wheels 89 are connected to the right front lower joint 31 and the left front lower joint 32. The front wheels 87 are connected to the right rear lower joint 33 and the left rear lower joint 34. The wagon can have a fabric body or panel body that retains articles.

The invention claimed is:

1. An articulating wagon frame having an open position and a closed position comprising:
   a. eight corner joints, namely four upper corner joints and four lower corner joints, wherein the four upper corner joints include a right front upper joint, a left front upper joint, a right rear upper joint, and a left rear upper joint, wherein the four lower corner joints include a right front lower joint, a left front lower joint, the right rear lower joint, and a left rear lower joint;
   b. four linear joints including a right middle upper joint, a left middle upper joint, a left middle lower joint, and a right middle lower joint;
   c. six vertical supports, including a right front vertical support, a left front vertical support, a right middle vertical support, a left middle vertical support, the right rear vertical support, and a left rear vertical support, wherein the right front vertical support connects the right front upper joint to the right front lower joint, wherein the left front vertical support connects the left front upper joint to the left front lower joint, wherein the right middle vertical support connects the right middle upper joint to the right middle lower joint, wherein the left middle vertical support connects the left middle upper joint to the left middle lower joint, wherein the right rear vertical support connects the right rear upper joint to the right rear lower joint, wherein the left rear vertical support connects the left rear upper joint to the left rear lower joint, wherein the six vertical supports make a rigid connection;
   d. twelve hinge members, namely six upper hinge members and six lower hinge members, wherein the six upper hinge members include a front upper hinge member, a front right upper hinge member, a front left upper hinge member, a rear left upper hinge member, a rear right upper hinge member, and a rear upper hinge member, wherein the six lower hinge members include a front lower hinge member, a front right lower hinge member, a front left lower hinge member, a rear right lower hinge member, a rear left lower hinge member, and a rear lower hinge member, wherein the twelve hinge members each have a hinge portion and a pair of extensions extending from the hinge portion, wherein the twelve hinge members are configured to fold between a hinge open position and a hinge closed position, wherein the front upper hinge member is pivotally connected between the right front upper joint and the left front upper joint, wherein the front upper hinge member is pivotally connected between the right front upper joint and the right middle upper joint, wherein the rear right upper hinge member is pivotally connected between the right middle upper joint and the right rear upper joint, wherein the rear upper hinge member is connected between the right rear upper joint and the left rear upper joint, wherein the rear left upper hinge member is connected between the left rear upper joint and the left middle upper joint, wherein the front left upper hinge member is connected between the left middle upper joint and the left front upper joint, wherein the front lower hinge member is connected between the left front lower joint and the right front door joint, wherein the front left lower hinge member connects the left front lower joint to the left middle lower joint, wherein the rear left lower hinge member connects the left rear lower joint to the left middle lower joint, wherein the rear lower hinge member connects the left rear lower joint to the right rear lower joint, wherein the rear right lower hinge member connects the right rear lower joint to the right middle lower joint, wherein the front right lower hinge member connects the right middle lower joint to the right front lower joint;
   e. one middle joint, wherein the one middle joint includes a first middle joint pivot, a second middle joint pivot, a third middle joint pivot, and a fourth middle joint pivot, wherein the first middle joint pivot is pivotally connected to a first middle member, wherein the second middle joint pivot is pivotally connected to a second middle member, wherein the third middle joint pivot is pivotally connected to a third middle member, wherein the fourth middle joint pivot is pivotally connected to a fourth middle joint member, wherein the first middle member is pivotally connected to the right front lower joint, wherein the second middle member is pivotally connected to the left front lower joint, wherein the third middle member is pivotally connected to the right rear lower joint, wherein the fourth middle member is pivotally connected to the left rear lower joint.

2. The articulating wagon frame of claim 1, wherein the twelve hinge members each have a first hinge socket and a second hinge socket, wherein the first hinge socket connects to a first extension, and wherein the second hinge socket connects to a second extension.

3. The articulating wagon frame of claim 1, wherein the right front upper joint abuts the left front upper joint at a front upper joint abutment when the wagon is in the closed position.

4. The articulating wagon frame of claim 1, wherein the right rear upper joint abuts the left rear upper joint at a rear upper joint abutment when the wagon is in the closed position.

5. The articulating wagon frame of claim 1, wherein the left middle upper hinge abuts the left front upper joint and the left rear upper joint at a pair of middle upper joint abutments when the wagon is in the closed position.

6. The articulating wagon frame of claim 1, wherein the right middle upper hinge abuts the right front upper joint and the right rear upper joint at a pair of middle upper joint abutments when the wagon is in the closed position.

7. The articulating wagon frame of claim 1, wherein the middle joint rises to fit between the right middle upper joint and the left middle upper joint when the wagon is in the closed position.

8. The articulating wagon frame of claim 1, wherein the twelve hinge members each have a first hinge portion having a first hinge socket and a second hinge portion having a second hinge socket, wherein the first hinge socket connects to a first extension, and wherein the second hinge socket connects to a second extension, wherein each of the twelve hinge members fold between a generally horizontal parallel orientation to a folded orientation.

9. The articulating wagon frame of claim 8, wherein the first hinge portion as a first hinge stop, and wherein the second hinge portion has a second hinge stop, wherein the first hinge stop abuts the second hinge stop when the articulating wagon frame is in open position.

10. The articulating wagon frame of claim 8, wherein the six upper hinge members are configured to abut the six lower hinge members when the articulating wagon frame is in closed position.

11. The articulating wagon frame of claim 8, wherein the twelve hinge members each have a first hinge socket and a second hinge socket, wherein the first hinge socket connects to a first extension, and wherein the second hinge socket connects to a second extension.

12. The articulating wagon frame of claim 8, wherein the right front upper joint abuts the left front upper joint at a front upper joint abutment when the wagon is in the closed position.

13. The articulating wagon frame of claim 8, wherein the right rear upper joint abuts the left rear upper joint at a rear upper joint abutment when the wagon is in the closed position.

14. The articulating wagon frame of claim 8, wherein the left middle upper hinge abuts the left front upper joint and the left rear upper joint at a pair of middle upper joint abutments when the wagon is in the closed position.

15. The articulating wagon frame of claim 8, wherein the right middle upper hinge abuts the right front upper joint and the right rear upper joint at a pair of middle upper joint abutments when the wagon is in the closed position.

16. The articulating wagon frame of claim 8, wherein the middle joint rises to fit between the right middle upper joint and the left middle upper joint when the wagon is in the closed position.

* * * * *